（12） United States Patent
Cornelius et al.

(10) Patent No.: US 6,330,792 B2
(45) Date of Patent: Dec. 18, 2001

(54) ROCKET ENGINE THRUST CHAMBER ASSEMBLY

(75) Inventors: Charles S. Cornelius; Richard H. Counts; W. Neill Myers, all of Huntsville; Jeffrey D. Lackey, Arab; Warren Peters, Meridianville; Michael D. Shadoan, Madison; David L. Sparks, Huntsville; Timothy W. Lawrence, Madison, all of AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/747,979

(22) Filed: Dec. 22, 2000

Related U.S. Application Data

(62) Division of application No. 09/228,034, filed on Dec. 10, 1998, now Pat. No. 6,195,984.

(51) Int. Cl.$^7$ ........................................................ F02K 9/00
(52) U.S. Cl. ................................ 60/257; 60/909; 156/169
(58) Field of Search ............................... 60/253, 257, 271, 60/909; 156/275.5, 169, 160, 161, 163; 239/265.1, DIG. 19

(56) References Cited

U.S. PATENT DOCUMENTS

| | | | | |
|---|---|---|---|---|
| 4,440,587 | * | 4/1984 | Thompson | 156/154 |
| 4,495,231 | * | 1/1985 | Laskaris | 428/36 |
| 5,145,543 | * | 9/1992 | Redd | 156/171 |

* cited by examiner

Primary Examiner—Timothy S. Thorpe
Assistant Examiner—Ehud Gartenberg
(74) Attorney, Agent, or Firm—James J. McGroary

(57) ABSTRACT

A thrust chamber assembly for liquid fueled rocket engines and the method of making it wherein a two-piece mandrel wrapped with a silica tape saturated with a phenolic resin, the tape extending along the mandrel and covering the combustion chamber portion of the mandrel to the throat portion. The phenolic in the tape is cured and the end of the wrap is machined. The remainder of the mandrel is wrapped with a third silica tape. The resin in the third tape is cured and the assembly is machined. The entire assembly is then wrapped with a tow of graphite fibers wetted with an epoxy resin and, after the epoxy resin is cured, the graphite is machined to final dimensions.

7 Claims, 5 Drawing Sheets

ROCKET ENGINE THRUST CHAMBER ASSEMBLY

This application is a Div. of Ser. No. 09/228,034, filed Dec. 10, 1998, and now U.S. Pat. No. 6,195,984.

ORIGIN OF THE INVENTION

This invention was made by employees of the United States Government and may be manufactured and used by or for the Government for governmental purposes without the payment of any royalties.

BACKGROUND OF THE INVENTION

1. Field of the Invention

This invention relates to thrust chamber assemblies for rocket engines.

2. Prior Art

It is known to use ablative liners for rocket engine combustion chambers. U.S. Pat. No. 4,458,595 discloses a solid rocket motor having a layer of silicone rubber and a second layer of an ablative lining placed between the motor casing and the propellant grain. The ablative lining layer contains chopped no voloid fibers 14 microns in diameter and having a nominal length of 1 millimeter interspersed throughout the polymeric composition.

U.S. Pat. No. 5,352,312 discloses a rocket motor insulation made of a liquid crystal polymer such as a wholly aromatic polyester with fillers such as glass or carbon fibers.

U.S. Pat. No. 3,973,397 discloses a rocket motor with an ablative lining made of a terpolymer of ethylene, propylene and a nonconjugated diene and inert fillers such as heavy metal halides, calcium hydroxide and magnesium hydroxide.

SUMMARY OF THE INVENTION

A thrust chamber assembly for liquid fueled rocket engines and the method of making it wherein a two-piece mandrel having the configuration of an assembly having a combustion chamber portion connected to a nozzle portion through a throat portion is wrapped with a silica tape saturated with a phenolic resin, the tape extending along the mandrel and covering the combustion chamber portion of the mandrel to the throat portion. The width of the tape is positioned at an angle of 30 to 50° to the axis of the mandrel such that one edge of the tape contacts the mandrel while the other edge is spaced from the mandrel. The phenolic in the tape is cured and the end of the wrap is machined to provide a frustoconical surface extending at an angle of 15 to 30° with respect to the axis of the mandrel for starting a second wrap on the mandrel to cover the throat portion. The remainder of the mandrel is wrapped with a third silica tape having its width positioned at a angle of 5 to 20° from the axis of the mandrel. The resin in the third tape is cured and the assembly is machined to provide a smooth outer surface. The entire assembly is then wrapped with a tow of graphite fibers wetted with an epoxy resin and, after the epoxy resin is cured, the graphite is machined to final dimensions.

DETAILED DESCRIPTION OF THE INVENTION

Figure 1:
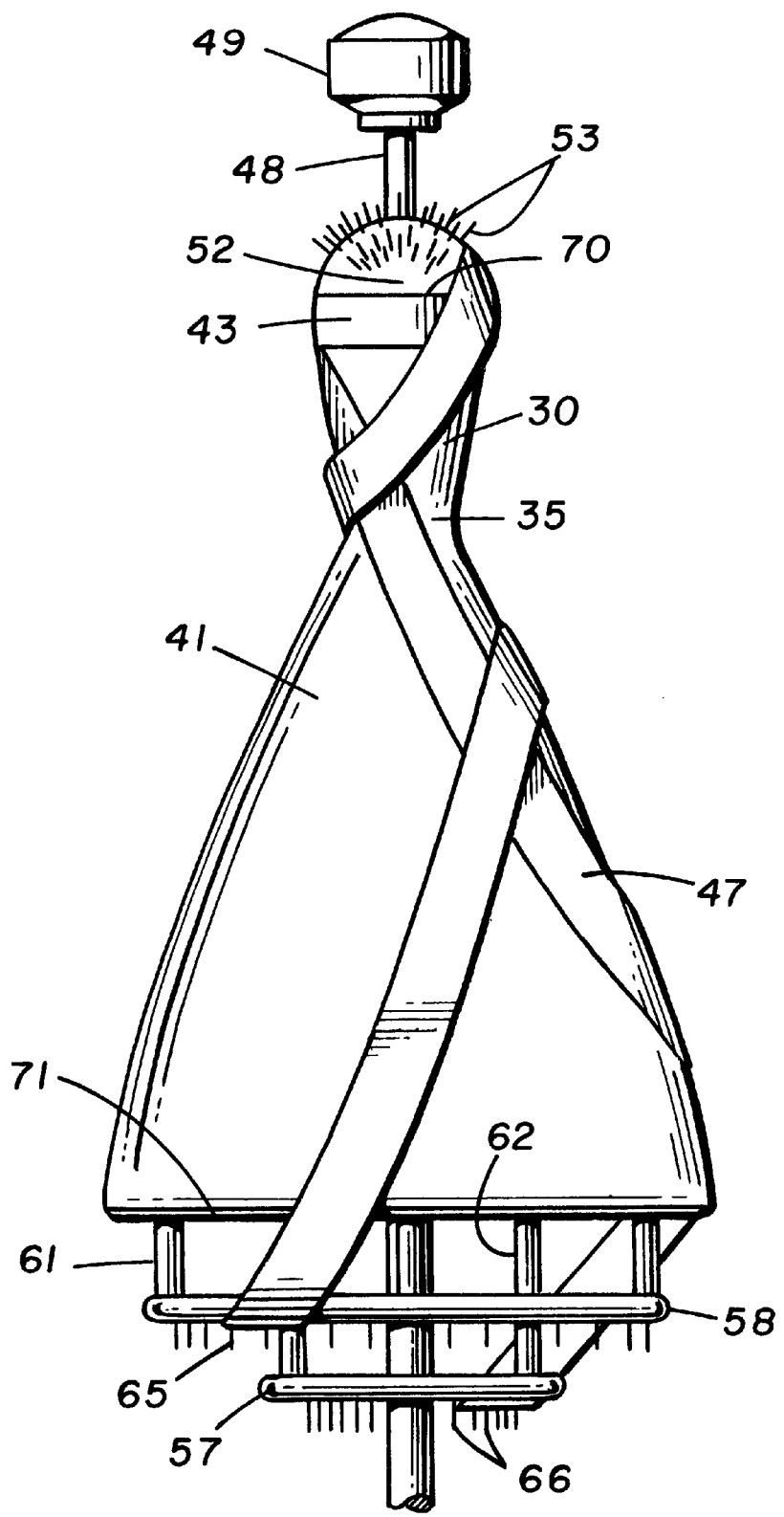
FIG. 1 is a schematic side view of a two-piece mandrel showing structure used with the mandrel to support graphite fibers wrapped on the mandrel to provide structural support.
Figure 4:
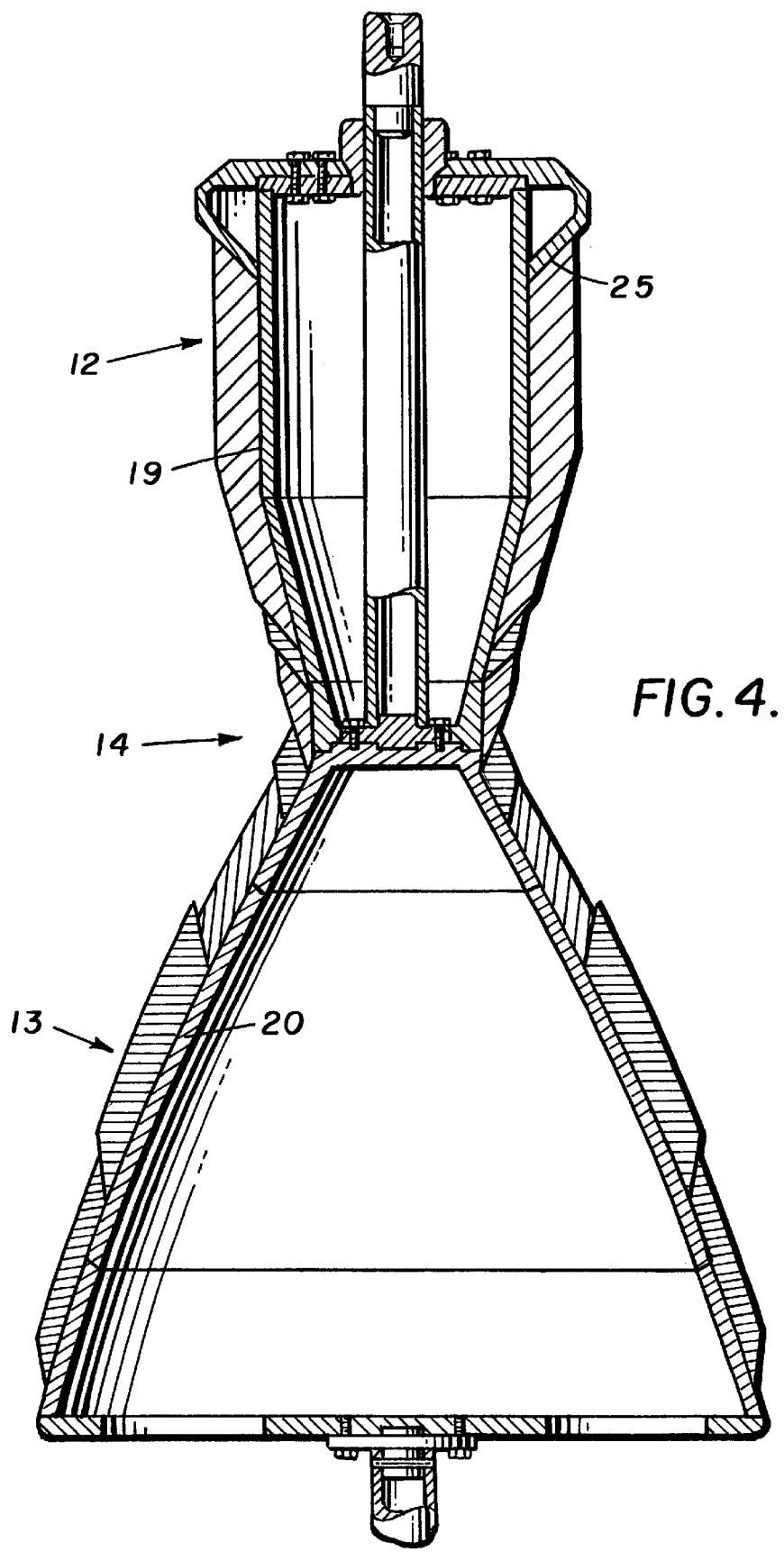
FIG. 4 is a cross sectional view showing the manner in which the mandrel is constructed.

Referring now in detail to the drawings, there is shown in FIGS. 1 and 4 a two-piece mandrel having, a combustion chamber portion 12 connected to a nozzle portion 13 through a throat portion 14, these portions having the configuration of the inner surface of the thrust chamber assembly to be made by this process—a generally hourglass configuration. The mandrel is made in two pieces 19 and 20 (FIG. 4) such that it can be taken apart and withdrawn from the completed thrust chamber assembly.

Figure 2A:
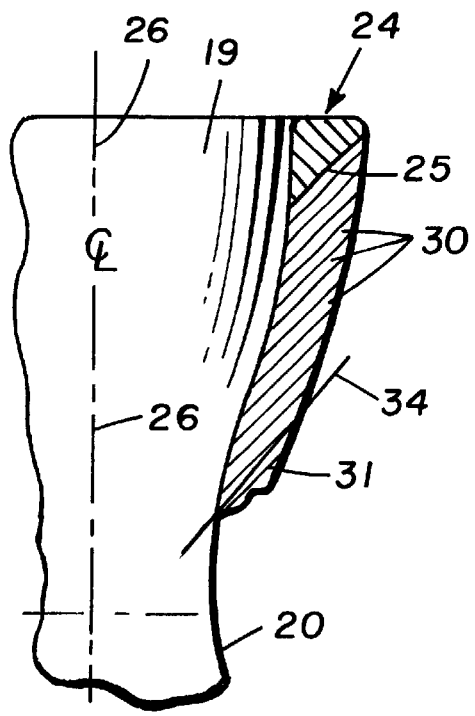
FIG. 2A is a greatly enlarged fragmentary view of the combustion chamber portion of the mandrel wrapped with a silica tape saturated with a phenolic resin.
Figure 2B:
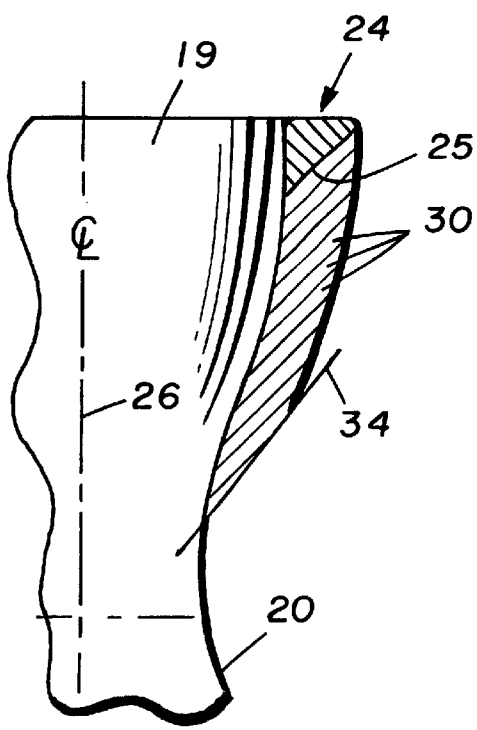
FIG. 2B is the view of FIG. 2A after the end of the first wrap has been machined to provide a starting surface or ramp for the second wrap of silica tape.
Figure 2C:
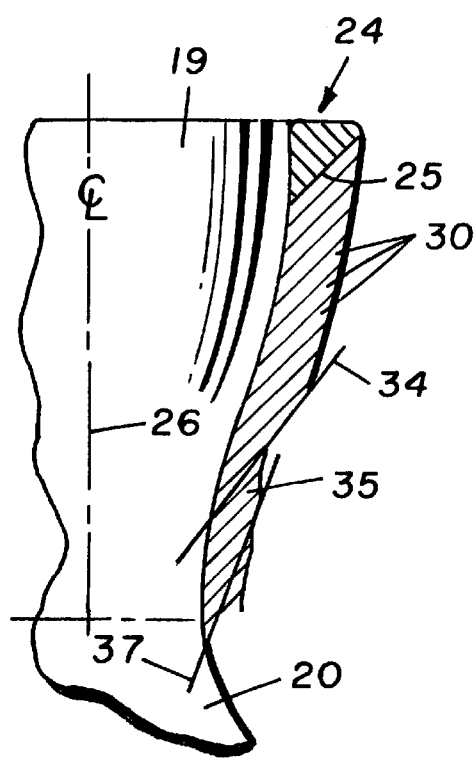
FIG. 2C is the view of FIG. 2B after the second wrap covering the throat portion has been completed.

FIG. 2A shows the first step in the making of this thrust chamber assembly. A ring 24 extending around the end of the combustion chamber portion 12 of the mandrel is provided with a surface 25 which is inclined at an angle of 30 to 50°, preferably 40 to 45°, with respect to the axis 26 of the mandrel. The surface 25 provides a starting point for the wrapping of a first silica tape 30 saturated with a phenolic resin, such that the width of the tape is positioned at the same angle with respect to the axis 26. The actual positioning of the tape is shown in FIGS. 2A–3. With the tape 30 wrapped in this manner one edge of the tape is in contact with the mandrel such that, when the combustion chamber portion is used as a combustion chamber the layers of the wrapped tape cannot delaminated.

Silica tape is commercially available. The tape is woven from fiberglass fibers and then treated with nitric acid. The nitric acid leaches out the sodium and lithium to leave a silica fabric The fabric is cut on the bias, at 45°, to form strips (not shown) having a width generally the same as the that desired for the tapes. The ends of the strips are then sewed together to form long lengths of the tape. When a tape of his type is used, the inner edge of the tape is free to compress and the outer edge is free to stretch. This allows the tape to be wound as described herein. The tape is saturated with a phenolic resin prior to being wrapped. The angles described herein are the angles between a line formed by the intersection of the tape with a plane in which the axis of the assembly is lying.

The first tape is wrapped from the combustion chamber portion to the throat portion 14 and terminates in an end 31. The phenolic resin in the wrapped silica tape is cured and the end 31 of the wrap is machined to a line 34 (FIG. 2A) to provide a starting point for the wrapping of the second silica tape 35. This machining provides a frustoconical surface (line 34)) which is the starting point for wrapping the second tape 35, the width of this surface being positioned at an angle of 15 to 30°, preferably 15 to 25°, to the axis 26 of the mandrel. The second tape 35 is wrapped on the throat portion 14 of the mandrel at this angle until the end of the throat portion 14 is reached.

Figure 2D:
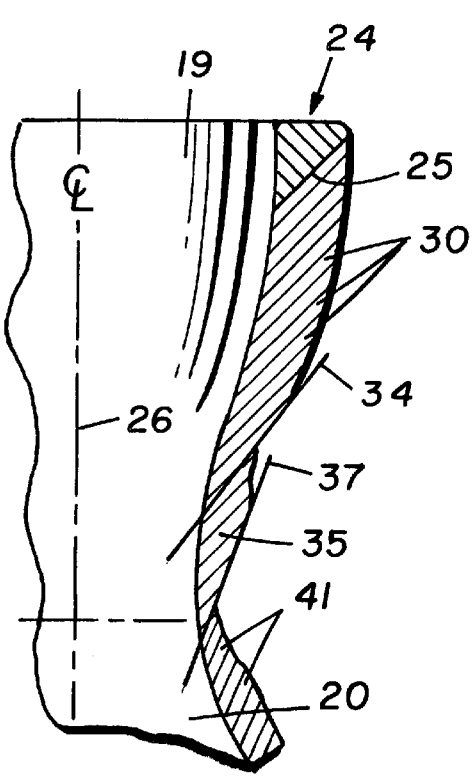
FIG. 2D is the view of FIG. 2C after the third wrap has been completed.
Figure 3:
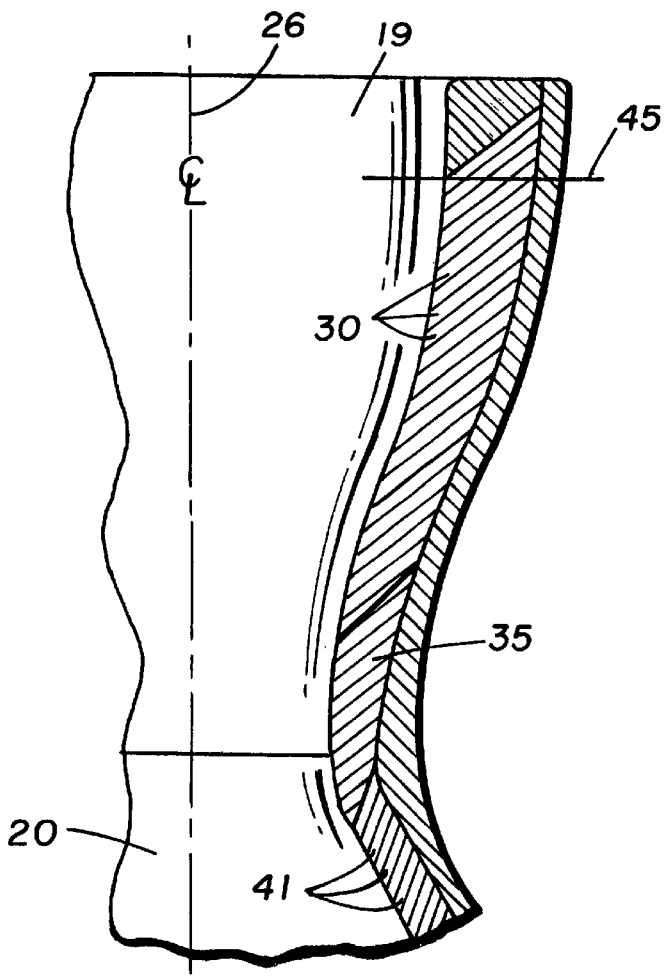
FIG. 3 is the view of FIG. 2 after the mandrel has been completely wrapped with the silica tape and the tow of graphite fibers and the cured overwrap of graphite fibers has been severed, fore and aft.
Figure 3A:
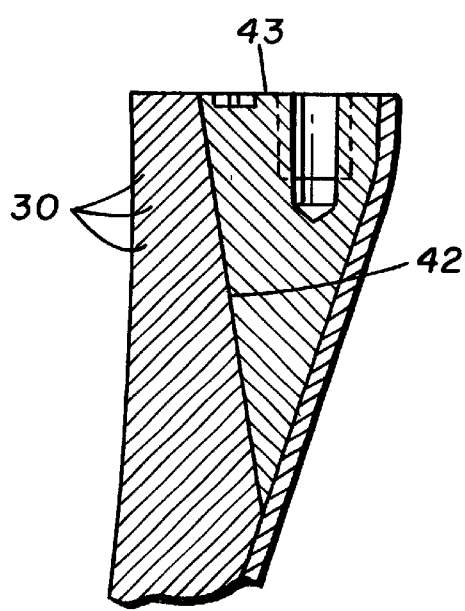
FIG. 3A is an enlarged fragmentary view showing the completed forward end of the thrust chamber showing a ring bonded between the silica phenolic wraps and the graphite wraps for supporting an injector.

The resin in the second tape is then cured and the end of the second portion is machined to a line 37 (FIG. 2C) to give a starting surface for the third wrap of silica tape 41 (FIG. 2D). This third wrap 41 is positioned at an angle of 5 to 15°, preferably 8 to 12°, to the axis of the mandrel and is carried to the end of the nozzle portion 12. The third wrap is then cured and the first wrap is cut off along line 45 of FIG. 3 and then the assembly is machined to provide a smooth outer surface and to provide a surface 42.

FIG. 1 shows the last wrapping step. A tow 47 of graphite filaments is wetted with an epoxy resin and then wrapped as shown in FIG. 1, the mandrel being mounted on a shaft 48 (FIGS. 1 and 4) which is driven slowly by a motor 49. One end of the mandrel is fitted with a dome 52 carrying a row of pins 53 extending around the dome. The purpose of the pins 53 is to hold the filaments making up the tow 47 in place as the tow is wrapped around the dome.

The other end of the mandrel is fitted with a pair of concentric rings 57 and 58 positioned as shown in FIG. 1, the rings being supported by posts 61 and 62, respectively. The rings 57 and 58 carry a plurality of pins 65 and 66, respectively. The purpose of the pins 65 and 66 is to hold the filaments in the tow 47 in alignment as the tow is wound over the rings for the next pass over the mandrel. From FIG. 1 it can be seen that when the mandrel is completely covered by the tow 47, the wrapped tow will exhibit a diamond pattern.

After the graphite tow wrapping is completed, the epoxy resin is cured and the graphite layer is severed along lines 70 and 71. The outer surface of the graphite layer is then machined to a smooth surface. The two piece mandrel is then removed from the thrust chamber assembly and an injector (not shown) is attached to the upper end of the thrust chamber assembly. Such an injector is disclosed and claimed in application Ser. No. 09/168,341, filed: Oct. 5, 1998 in the names of Charles A. Cornelius, et al. for LOW COST INJECTOR ASSEMBLY.

Figure 5:
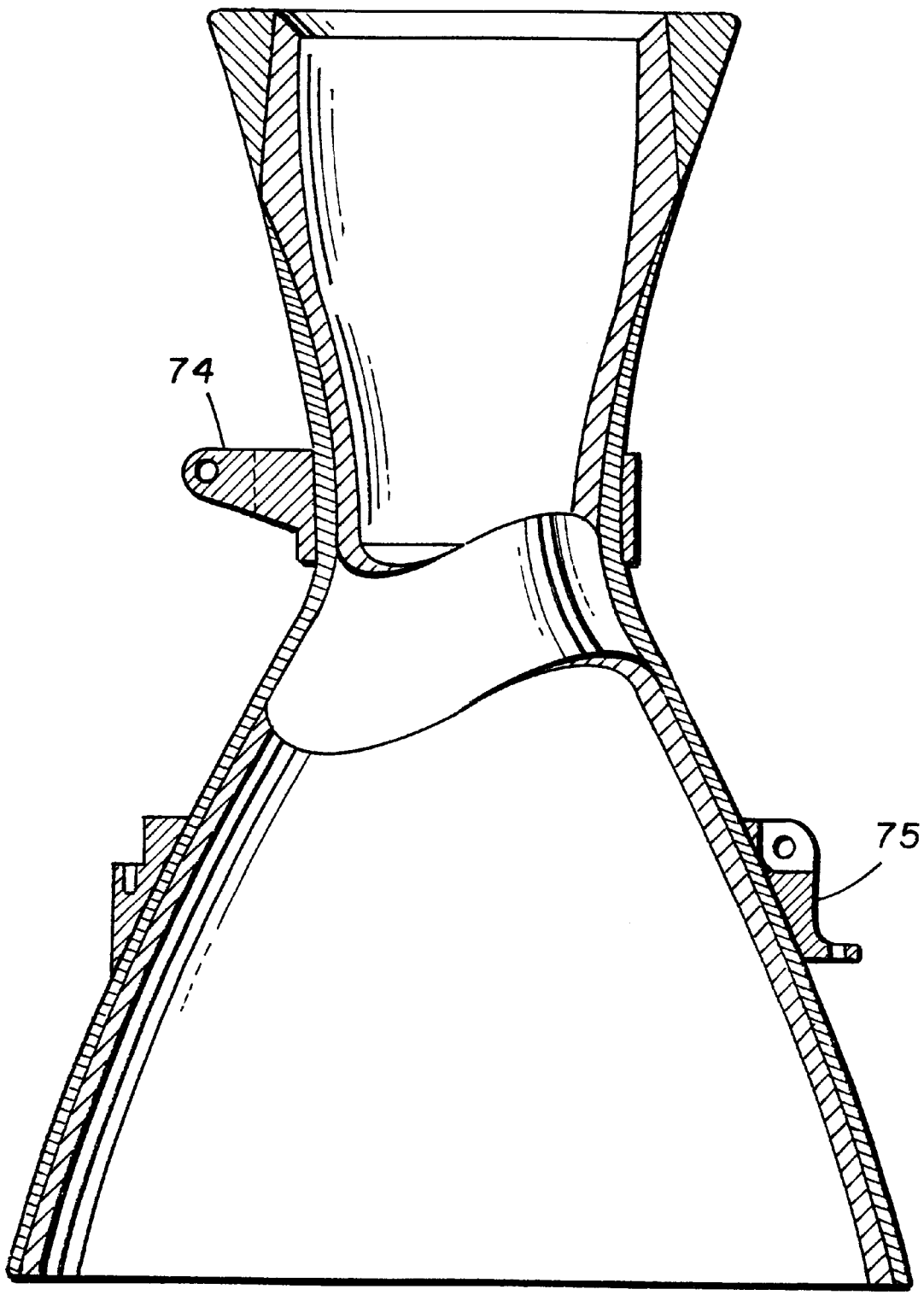
FIG. 5 is a cross sectional view showing the completed thrust chamber with support rings attached.

Prior to use of the use of the thrust chamber assembly, a pair of attachment rings 74 and 75 (FIG. 5) are bonded to the assembly. These attachment rings are using for supporting other equipment (not shown) which cooperates with the assembly and gimbals the entire assembly for steering a rocket (not shown) on which the assembly is mounted In operation, the injector (not shown) injects streams of kerosene and liquid oxygen into the combustion chamber where the kerosene is burned to provide thrust for the engine. A char layer forms on the silica phenolic tape layer, providing insulation for the assembly. The angle at which the silica layers are wrapped prevents the tape layers from delaminating.

What is claimed is:

1. A method for making in substantially one piece a thrust chamber assembly for a rocket engine, said assembly having a combustion chamber a throat and a nozzle connected in series, comprising
    a. providing a two-piece mandrel having a configuration of said combustion chamber, throat and nozzle portions portion, said mandrel having an axis;
    b. wrapping the mandrel with a generally flat fabric tape saturated with a curable thermosetting resin; said tape having first and second edges, said tape width being positioned at an acute angle with respect to said axis such that one of the edges of the tape is in contact with the mandrel and the other edge is spaced from the mandrel;
    c. curing the thermosetting resin;
    d. wrapping the assembly with a tow of graphite fibers wetted with an epoxy resin to form a structural layer; and
    e. curing the epoxy resin.
2. The process of claim 1 wherein the tape is a silica tape.
3. The process of claim 2 wherein the tape is saturated with phenolic resin.
4. A method for making in substantially one piece a thrust chamber assembly for a rocket engine, said assembly having a combustion chamber, a throat and a nozzle connected in series, comprising:
    a. providing a two-piece mandrel having a configuration of said combustion chamber, throat and nozzle portions portion, said mandrel having an axis;
    b. wrapping said combustion chamber and said throat portions of the mandrel with a first fabric tape saturated with a curable, thermosetting resin, said wrapping having an end at said throat portion of said mandrel; said tape being wrapped at an angle such that the width of the tape is positioned at an angle of 30 to 50° with respect to said axis;
    c. curing the thermosetting resin;
    d. machining the end of the wrapping to form a frusto-conical surface having an angle of 5 to 30° with respect to said axis;
    e. wrapping the nozzle portion with a second fabric tape saturated with a curable, thermosetting resin, said wrapping beginning at said frustoconical surface and having the same angle as said frustoconical surface;
    f. curing the second fabric tape;
    g. machining said end of said second tape to form a third frustoconical surface having angle of 5 to 15° with respect to said axis;
    h. wrapping a third fabric tape saturated with a thermosetting resin, said third wrapping beginning at the machined end of said second wrap and having the same angle as the third frustoconical surface;
    i. curing the third fabric tape;
    j. wrapping the assembly with a tow of graphite fibers wetted with an epoxy resin to form a structural layer; and
    k. curing the epoxy resin.
5. The process of claim 4 wherein the fabric tape is a tape woven from silica fibers.
6. The process of claim 5 wherein the thermosetting resin is a phenolic resin.
7. The process of claim 6 wherein the first fabric tape is wrapped at an angle of 40 to 45° with respect to said axis; the second fabric tape is wrapped at an angle of 15 to 25° with respect to said ax,is; and the third fabric tape is wrapped at an angle of 8 to 12° with respect to said axis.

* * * * *